Feb. 4, 1969 R. PALETTO 3,425,880

METHOD OF MAKING P-N ALLOY JUNCTIONS

Filed Oct. 22, 1965

INVENTOR
RAIMONDO PALETTO
BY
Young & Thompson
ATTORNEYS

United States Patent Office 3,425,880

Patented Feb. 4, 1969

3,425,880

METHOD OF MAKING P-N ALLOY JUNCTIONS

Raimondo Paletto, Catania, Italy, assignor to Ates Componenti Elettronici S.p.A.
Filed Oct. 22, 1965, Ser. No. 501,530
Claims priority, application Italy, Apr. 8, 1965, 7,701/65
U.S. Cl. 148—177 6 Claims
Int. Cl. H01l 7/46

ABSTRACT OF THE DISCLOSURE

A method of making P-N alloy junctions comprises assembling on a solid semiconductor five superposed layers, the layer next to the semiconductor and the fifth layer from the semiconductor consisting essentially of indium or indium alloy, the second and fourth layers consisting essentially of a metal selected from the group consisting of nickel, gold, silver, copper and alloys thereof with each other, and the third or middle layer consisting essentially of aluminum or aluminum alloy. The composite is heated to a temperature higher than the melting point of the first layer until a portion of the second and third layers and of the semiconductor diffuse into the layer which is next to the semiconductor.

This invention relates to methods of making junctions, more particularly for making improved P-N alloy junctions.

A semiconductor material such as germanium may be used as the N zone, while materials having a high segregation coefficient such as aluminum may be used together with indium to make the P zone.

By considering the method object of the invention with particular regard to manufacture of transistors, it is necessary that the P-N junction be carefully controlled as to its various characteristics. It is desirable, in the transistors, that a constant gain in $h_{FE}$ current be obtained within as wide a range as possible of collector current $Ic$ variation. It is also desirable that the P zone be highly conductive.

A number of methods can be postulated for making a P-N alloy junction. In one such method, small quantities of finely divided aluminum and indium are mixed together and then fused onto a substrate of indium which has been soldered to the semiconductor such as germanium. However, the joint formed in this way does not tend to be uniplanar, and aluminum does not readily diffuse because of the presence of aluminum oxide. Accordingly, the alloy zone between the N and P zones cannot be accurately controlled. Also, on a mass production basis, the rejection rate of defective products is quite high.

Another method which might be postulated comprises the preceding method but carried out in a reducing atmosphere such as hydrogen. Except for improvement in the uniplanar nature of the junction and in the growth of the crystalline zone, the above difficulties remain. Moreover, such a method is rather complicated.

A third method which might be postulated comprises the fusing of a sandwich of indium-aluminum-indium on a germanium substrate. However, oxide inevitably forms on the surface of the aluminum layer, which reduces the diffusion characteristics of the aluminum, so that the aluminum cannot readily diffuse into the indium layer. Accordingly, the difficulties of the method first described remain.

An object of the present invention is to provide means for making junctions having a high planing and regularity ratio and having a good control of the junction area and very high doping.

Accordingly, it is also an object of the present invention to provide methods for making junctions, in which the rejection rate of mass-produced junctions is desirably low.

A further object of the present invention is the provision of methods for making transistors, in which the current gain does not vary greatly from its average as the collector currents fluctuate in the range of a few milliamperes to about one ampere.

It is also an object of the present invention to provide methods for making transistors in which the breakdown voltage will be desirably high, the midthickness of the junction zone being unaffected.

The invention also contemplates the provision of methods for making junctions having a high conductivity in the alloyed zone.

Still another object of the present invention is the provision of methods for making junctions, in which the materials are so chosen as to have a decelerating effect on the dissolving of the semiconductor substance, with the result that the crystalline characteristics of the junction can be closely controlled.

Still another object of the present invention is the provision of methods for making transistors which will have low saturation voltage.

The invention also contemplates the provision of methods for making transistors in which it is practical to use aluminum in the P zone.

It is a further object of the present invention to provide methods for making transistors which are adaptable for use not only in relay circuits and switching circuits but also in driver stages.

The invention also contemplates the provision of methods for making transistors in which the output signal distortion shows no appreciable variation during fluctuation of the transistors reference current and the amplitude of the input signals.

It is a further object of the present invention to provide methods for making transistors which are particularly well adapted for standardized mass production.

Finally, it is an object of the present invention to provide methods for making transistors which will be relatively simple and inexpensive to practice with uniformly desirable results.

Other objects and advantages will become apparent from a consideration of the following description, taken in connection with the accompanying drawing, in which.

Figure 4:
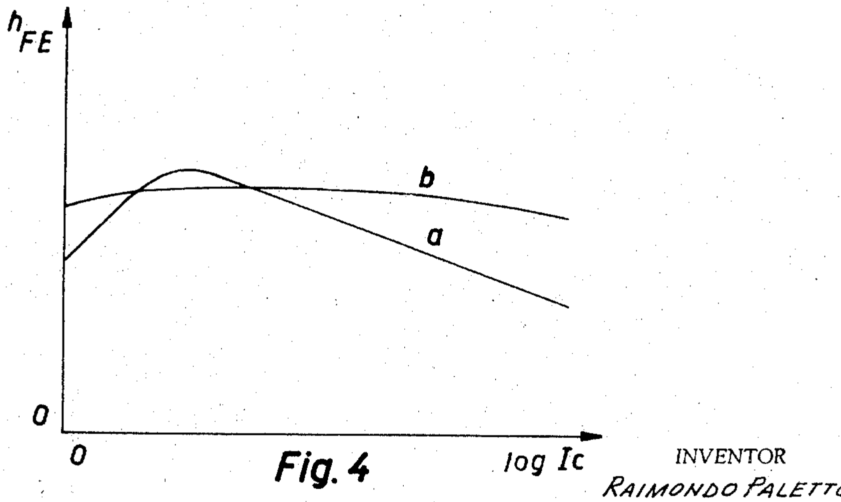

FIGURE 4 compares two typical curves, $h_{FE}$ versus log $Ic$, of a transistor according to the prior art $a$ and a transistor according to the present invention $b$.

Briefly, the invention comprises the discovery that junctions having desirable characteristics can be manufactured by assembling on a solid semiconductor at least three superposed layers, the layer next to the semiconductor consisting essentially of indium or its alloys, the second layer consisting essentially of a metal selected from the class consisting of nickel, gold, silver, copper and alloys thereof with each other, and the third layer consisting essentially of aluminum or its alloys, and heating the composite until a portion of the second and third layers and of the semiconductor material diffuse into the indium. Preferably, heating is conducted above the melting point of indium. It is also preferable that the said selected metal be nickel.

In speaking of "indium" and "aluminum" and the other metals herein, it is to be understood that alloys based on these metals are also included, that is, alloys in which the said metals comprise most of the alloy.

It is also a preferred feature of the invention that the plural superposed layers bonded to the semiconductor substrate are at least five in number, the first and fifth layers consisting essentially of indium, the second and fourth layers consisting essentially of a selected metal as above, and the third or middle layer consisting essentially of aluminum. A still more preferred embodiment is one in which the middle layer is a sheet of aluminum coated on both sides with a said selected metal, this composite in turn being coated on both sides with indium.

Figure 1:
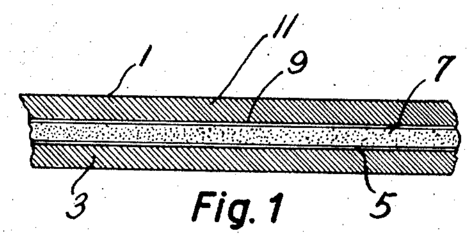
FIGURE 1 is a greatly enlarged cross-sectional view of the strip from which, according to the present invention, segments may be cut for the production of P zones.

Referring now to the drawings in greater detail, and with particular reference to FIG. 1, it will be noted that a blank 1 for producing P junctions according to the present invention is provided, comprising five superposed layers 3, 5, 7, 9 and 11. The first layer 3, which is to be next to the semiconductor such as germanium, consists essentially of indium. The second layer 5 consists essentially of a metal selected from a class consisting of nickel, gold, silver, copper and alloys thereof with each other. The third layer 7, which is the middle layer, consists essentially of aluminum, and in a preferred embodiment is a sheet of highly pure aluminum. The next or fourth layer 9 is essentially of the same composition as layer 5, while the fifth layer 11 is essentially the same composition as layer 3.

The composite of FIG. 1 is produced starting with a sheet of purest aluminum, 6 to 20 microns thick depending on the degree of alloy diffusion and the size of the junction that is required. The sheet is chemically cleaned, and a thin layer of nickel or other member of the selected group a few microns thick is deposited on both sides of the aluminum sheet 3 by electrolytic deposition, electrochemical deposition upon immersion, or evaporation under vacuum. The thickness of this applied layer is such that no oxidation of its aluminum substrate is possible.

The composite of layers 5, 7 and 9 is then indium coated electrolytically or by hot or cold rolling or by immersion in a bath of fused indium. The plate is then cut into segments or grains of the required size.

Figure 2:
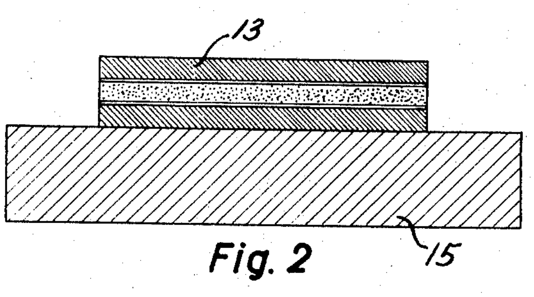
FIGURE 2 shows such a segment assembled to a semiconductor substrate prior to heating.

A segment 13 is then placed on a substrate 15 of a solid semiconductor material such as germanium, as in FIG. 2. The composite is then heated above the melting point of indium, whereupon the indium melts and the nickel or other selected metal, as well as the aluminum and the germanium, partially fuse or dissolve into the indium layer which is next to the germanium substrate. This process of diffusion alloying of course can be accelerated by an increased temperature.

It is desirable to keep the thickness of the indium layer next to the germanium relatively small compared to its length and breadth. In this way, it is possible to insure that when the indium melts, it will not run over the germanium substrate. At the same time, the aluminum and the nickel do not melt at as low a temperature as the indium, and the length and breadth of the solid nickeled surface in the present invention seem to regulate the extent of the diffusion alloyed zone. A thus-alloyed zone according to the present invention is of a uniform depth over the entire liquefied area, as seen in FIG. 3.

Figure 3:
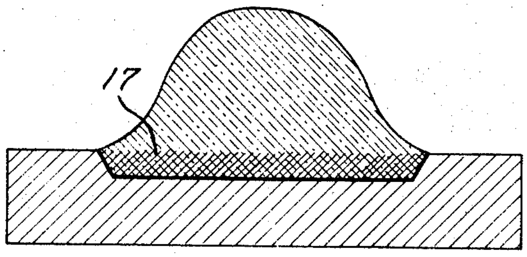
FIGURE 3 shows the assembly of FIG. 2 after heating.

With heating substantially above the melting point of indium, a junction 17 can be formed as in FIG. 3. This junction is the same in size as the segment shown in FIG. 2 and can be thus closely controlled in size. Its surface is smooth and regular and the recrystallization is quite uniform. The tapering at the edges of the junction 17 is limited and is inclined at an angle very close to the theoretical angle for a perfect recrystallization. Diffusion alloying throughout the zone is quite thorough and uniform. In short, the product is admirably adapted for mass production.

Although it is preferred that the P zone be thus five layered as initially applied to the semiconductor substrate, it will be appreciated that it is necessary only that the three layers 3, 5 and 7 be present. However, it is preferred that layers 9 and 11 also be present, so as to provide a connection for rheophores. A five-layered segment as shown provides a surplus of indium in which the rheophores can be inserted. Thus, although for the reasons pointed out above, it is desirable that layer 3 be suitably thin, the layer 11 which may subsequently provide connection for rheophores need not be so closely controlled or limited in thickness. It is often convenient in manufacturing to produce the layer 11 of the same thickness as the layer 3, and this procedure can be followed in the absence of requirements to the contrary.

Turning now to the plot shown in FIG. 4, of $h_{FE}$ versus log $I_c$, it will be noted that the curve *a* represents the typical characteristics of a transistor according to the prior art; while curve *b* represents typical characteristics of a transistor according to the present invention. In the case of transistors according to the present invention, it can be seen from FIG. 4 that the current gain varies by at most 20% from its average when the collector current fluctuates in the range of a few milliamperes to about one ampere. Fluctuation of these values in transistors according to the prior art, however, is much more pronounced and irregular.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention.

Having described my invention, I claim:

1. A method of making P-N alloy junctions, comprising assembling on a solid semiconductor three superposed layers, the layer next to the semiconductor being thin in comparison to its length and breadth, and consisting essentially of indium or indium alloys, the second layer consisting essentially of a metal selected from the group consisting of nickel, gold, silver, copper and alloys thereof with each other, and the third layer consisting essentially of aluminum or aluminum alloys, and heating the composite to a temperature higher than the melting point of the material which constitutes the layer next to the semiconductor until a portion of the second and third layers and of the semiconductor diffuse into the layer next to the semiconductor thereby to form a P-N alloy junction.

2. A method as claimed in claim 1, in which the second layer consists essentially of nickel.

3. A method of making P-N alloy junctions, comprising assembling on a solid semiconductor five superposed layers, the layer next to the semiconductor and the fifth layer from the semiconductor consisting essentially of indium or indium alloys, the second and fourth layers consisting essentially of a metal selected from the group consisting of nickel, gold, silver, copper and alloys thereof with each other, and the third or middle layer consisting essentially of aluminum or aluminum alloys, and heating the composite to a temperature higher than the melting point of the material which constitutes the layer next to the semiconductor until a portion of the second and third layers and of the semiconductor diffuse into the layer next to the semiconductor thereby to form a P-N alloy junction.

4. A method as claimed in claim 3, in which the second and fourth layers consist essentially of nickel.

5. A method of making P-N alloy junctions, comprising coating opposite sides of a strip of aluminum with a metal selected from the class consisting of nickel, gold, silver, copper and alloys thereof with each other, adding to opposite sides of the coated strip a coating of indium, applying at least a portion of the twice-coated strip to a surface of a solid semiconductor, and heating the composite to a temperature higher than the melting point of the indium until a portion of the aluminum and its first coating on the semiconductor side and of the semiconductor itself diffuse into the layer of indium which is next to the semiconductor thereby to form a P-N alloy junction.

6. A method as claimed in claim 5, in which the first coating of the aluminum strip is essentially nickel.

References Cited

UNITED STATES PATENTS

| | | | |
|---|---|---|---|
| 2,833,678 | 5/1958 | Armstrong et al. | 148—185 |
| 3,166,449 | 1/1965 | Finn et al. | 148—185 |
| 3,208,889 | 9/1965 | Emeis | 148—185 |

RICHARD O. DEAN, *Primary Examiner.*

U.S. Cl. X.R.

148—185